(No Model.)
M. H. ROBINSON.
APPARATUS FOR DISCHARGING WATER.
No. 464,716. Patented Dec. 8, 1891.
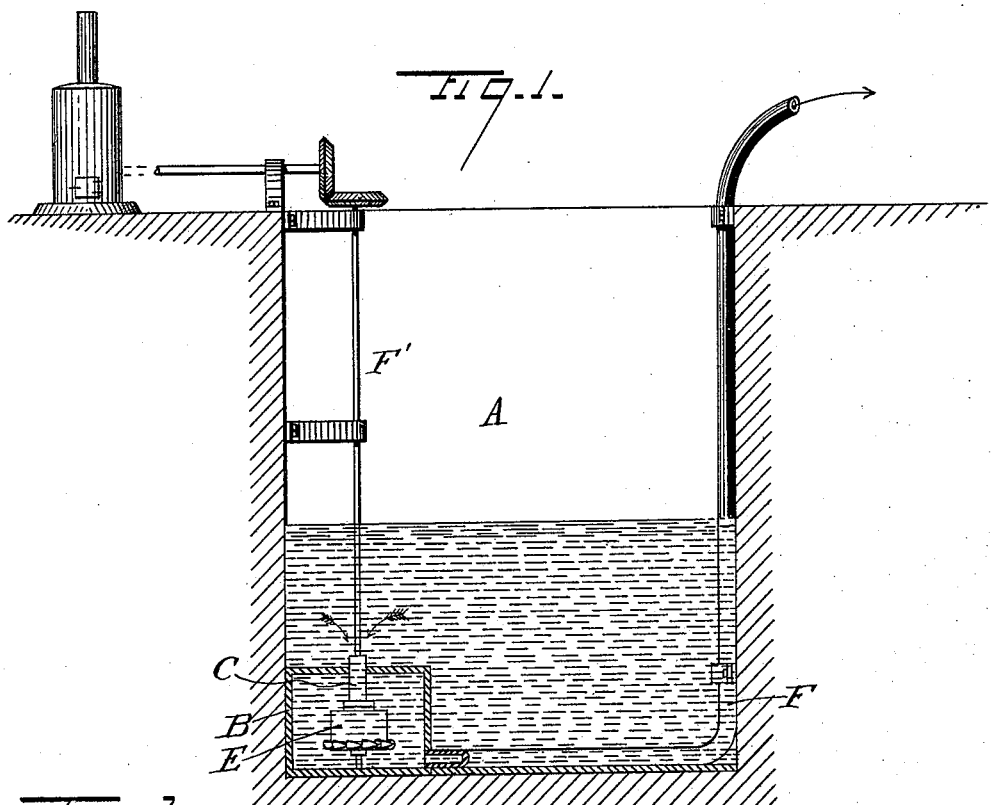
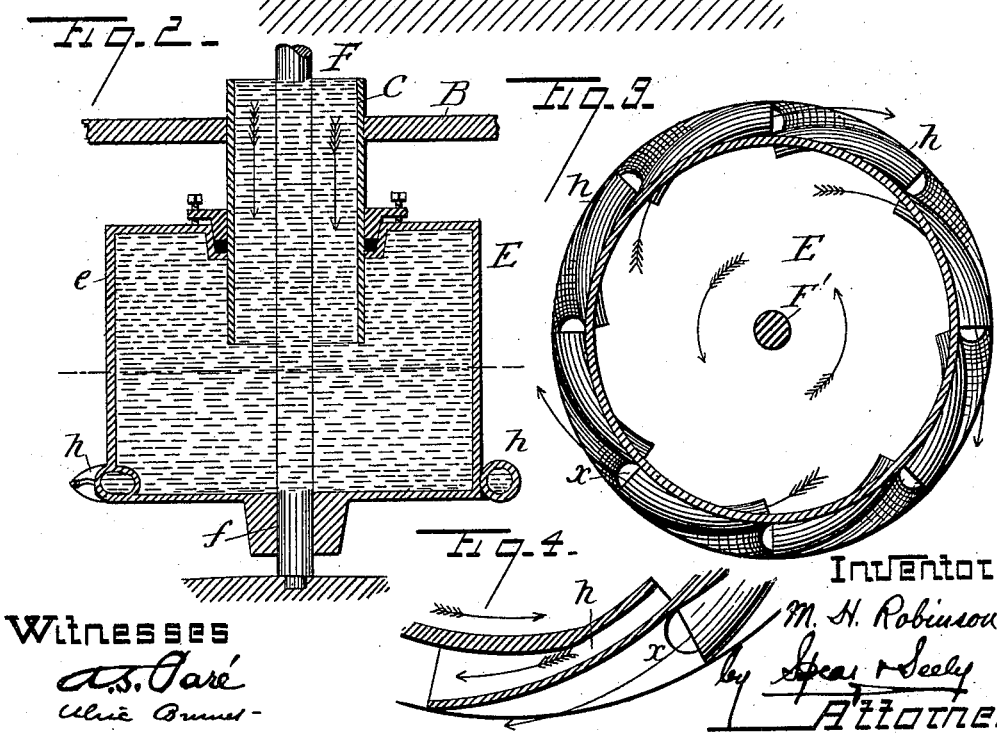

UNITED STATES PATENT OFFICE.

MOSES H. ROBINSON, OF SAN DIEGO, CALIFORNIA.

APPARATUS FOR DISCHARGING WATER.

SPECIFICATION forming part of Letters Patent No. 464,716, dated December 8, 1891.

Application filed December 22, 1890. Serial No. 375,478. (No model.)

*To all whom it may concern:*

Be it known that I, MOSES H. ROBINSON, a citizen of the United States, and a resident of the city and county of San Diego, State of California, have invented certain new and useful Improvements in Apparatus for Discharging Water; and I do hereby declare that the following is a full, clear, and exact description of the same.

My invention relates to apparatus for elevating and discharging water from wells, streams, or bodies of water of any kind. The object of my invention is to provide means for discharging water from any body of the latter rapidly and cheaply without the expense always attending the use of pumping-engines of even small power.

The invention consists in a submerged hollow wheel capable of rapid rotation within a closed tank and having one or more series of discharge-nozzles, the rotation producing a vacuum behind each nozzle, by means of which water admitted to the interior of the wheel will be discharged through said nozzles into the tank with great velocity. The tank is provided with a discharge-pipe, which offers the only means of escape for the water contained therein.

In the accompanying drawings, Figure 1 is a sectional view showing the apparatus as located in a well or tank, power connections, and a discharge-pipe through which the water is elevated. Fig. 2 is a perspective view of the rotary wheel which receives and discharges the water. Fig. 3 is a plan view of the wheel. Fig. 4 is a sectional view of one of the nozzles.

In the drawings, A represents a well supplied with water, either naturally or from any suitable source of supply. It should be understood, however, that my apparatus can be used in connection with bodies of water of any kind or extent, whether natural or artificial, and it is only for convenience in illustration that I have shown it in position for operating in a well. Submerged in the body of water is a tank B, into the top of which enters the water-inlet pipe C, with a water-tight joint at the connection, while from the bottom of the tank a discharge-pipe F extends up through and out of the well, as shown.

E is a rotary wheel of peculiar construction, a perspective view of which is shown in Fig. 3. It is a hollow cylinder, preferably of metal and having a closed bottom and an upwardly-extending cylindrical portion $e$, which is swiveled upon the stationary inlet-pipe C, so that the whole wheel may revolve freely. A vertical shaft F' is journaled in the bottom of the tank, and the wheel E is rigidly fixed upon this shaft at $f$. The shaft extends up through the inlet-pipe and well to the surface, where it is connected by any suitable gearing to some source of power, such as a small steam-engine. The wheel and tank being submerged, as shown, water is permitted to enter freely into the inlet-pipe and the interior of the wheel E. The periphery of the wheel is provided with a number of outlet pipes or nozzles $h$ of tapering shape, each communicating with the interior of the wheel and forming a regular series around its exterior. Their tapering shape creates lines of small resistance to enable them to pass freely through the water in the direction of the arrow. Any number of these nozzles may be employed, and the outlet-openings of each may be of any desired shape in cross-section. I have shown them as circular, however, in this instance. By enlarging the wheel space will be afforded for several rows of these discharge-nozzles, instead of the single row shown. When power is applied to the shaft and the wheel is thereby given rapid rotation in the direction of the arrow, a vacuum will be formed by displacement of the water behind each of these nozzles or at the point $x$. This vacuum and the pressure of the water in the wheel and inlet-pipe will cause the water to be thrown violently out of the wheel through these nozzles and into the surrounding tank. The latter being water-tight, excepting at the discharge-opening F, the water has no way of escape but by that outlet, and the continued rotation of the wheel and discharge of water from it will create a pressure in the tank, which will force the water through and out the discharge-pipe to any height desired. The production of a vacuum behind each of the discharge-nozzles constitutes one of the essential principles of my invention, and this vacuum can only be filled by water from the interior of the wheel, because, with the wheel running at speed, the external water displaced to form the vacuum cannot overtake the nozzle just in advance of it. Hence there is a constant discharge of water at great velocity into the tank, the only escape for which is by the discharge-pipe F. The water thus elevated and discharged may be carried through suitable pipes and distributed for irrigation or other purposes or for furnishing power, and large volumes of water for such purposes may be supplied at very small expense as compared to the cost of steam-pumps or windmills and with a much less expenditure of power.

I do not confine myself to any details of construction shown, because such details must be varied to suit different situations and apparatus of different capacities, and I regard any and all such changes as within the scope and spirit of my invention, for which I make the following claims:

1. In a water-discharging apparatus, a hollow wheel with a water-inlet pipe connected therewith, a surrounding-tank, and discharge-nozzles arranged around the periphery of the hollow wheel, said nozzles inclining from their front ends at the periphery outwardly in relation thereto and tapering from their rear ends to the said periphery, substantially as described.

2. An apparatus for discharging water, which consists of a water-tight tank adapted to be submerged and having a single discharge-opening connected to a discharge-pipe, an inlet-pipe entering said tank and having its inlet end below the surrounding water-level, and a hollow rotary wheel swiveled upon said inlet-pipe and having peripheral discharge-nozzles, substantially as set forth.

In testimony whereof I have hereunto affixed my signature, in the presence of two witnesses, this 6th day of December, 1890.

MOSES H. ROBINSON.

Witnesses:
GEO. T. KNOX,
H. J. LANG.